United States Patent Office 3,129,216
Patented Apr. 14, 1964

3,129,216
5-BASIC SUBSTITUTED-5-DIBENZO-[b,e] [1,4]-DIAZEPINES
Jean Schmutz and Fritz Hunziker, Bern, Switzerland, assignors to Dr. A. Wander, S.A., Bern, Switzerland, a corporation of Switzerland
No Drawing. Filed Oct. 31, 1961, Ser. No. 160,382
9 Claims. (Cl. 260—239)

This invention relates to novel heterocyclic nitrogen-containing compounds and a method of producing the same.

It is known from British Patent No. 738,013 to effect dehydration and ring closure of certain substituted diphenylamines whereby to obtain heterocyclic compounds having therapeutic properties and useful as intermediates in the preparation of other therapeutic compounds. However, in that case the substitutent group on the bridging nitrogen atom between the phenyl rings was an alkyl, aryl, or aralkyl group.

We have now found that valuable therapeutic agents identified generally as 5-basic substituted 5-dibenzo-[b,e][1,4]-diazepins can be obtained by effecting dehydration and ring closure of the appropriate o-acylamino-diphenylamines. Our new compounds are characterized particularly by the inclusion of a basic side chain or substitutent on the bridging nitrogen atom between the phenyl rings.

The starting materials to be subjected to dehydration and ring closure in accordance with the present invention are represented by the following Formula I:

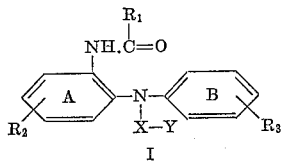

I in which the ortho position of ring B is unsubstituted, i.e., has at least one hydrogen atom. The 5-substituted 5-dibenzo-[b,e][1,4]-diazepins obtained by dehydration and ring closure of the compounds of Formula I, in accordance with the present invention, are represented by the following Formula II:

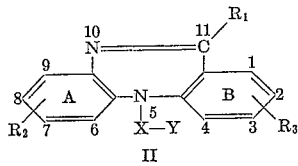

II

In each of the Formulas I and II; $R_1$ is hydrogen, methyl, ethyl, propyl, and isopropyl; $R_2$ and $R_3$ are hydrogen, chlorine, methyl, ethyl, methoxy, methylthio, and ethylthio; X is a normal or branched hydrocarbon chain containing between two and three inclusive carbon atoms (preferably, an ethylene, propylene and isopropylene radical); and Y is a dimethylamino, diethylamino, methylethyl-amino, piperidino, pyrrolidino, morhpolino, N'-methylpiperazino and N'-ethylpiperazino group, and with the nitrogen containing group being connected to X at the nitrogen atom or at one of the ring carbon atoms in which case the nitrogen atom has an alkyl group.

The dehydration and ring closure of compounds of the type represented by Formula I to obtain the heterocyclic compounds of Formula II may be effected by heating the Formula I starting material with the usual dehydrating and condensing agents comprising a phosphorus oxide (e.g., the pentoxide), halide or oxyhalide, or a mixture thereof. However, we have found that excellent results and good yields are obtained by employing a polyphosphoric acid as the dehydrating and condensing agent at relatively high temperatures. As described in more detail in the specific examples, a preferred agent comprises polyphosphoric acid containing about 83% $P_2O_5$, the reaction being conducted for several hours at a temperature of from about 140° C. to about 160° C. Although ring closure of somewhat similar compounds has heretofore been known, as mentioned above, it was totally unexpected to find that ring closure is also successful with compounds of the Formula I type having the basic side chain X—Y on the bridging nitrogen atom between the phenyl rings.

The compounds of the Formula II type are strong bases which may readily be converted to water soluble, pharmaceutically active, non-toxic salts. For example, suitable inorganic acid salts include the hydrochlorides, hydrobromides, sulfates, etc. Suitable organic acid salts may also be formed, e.g., the maleates, tartrates, etc. The mono- and di-quaternary ammonium derivatives are also useful, such derivatives being obtained, for example, by reacting the bases with a quaternizing agent such as a dialkylsulfate, an alkyl halide, or a sulfonic acid alkyl ester. The inorganic and organic acid salts of the mono- and di-quaternary salts may also be formed as described above.

The Formula II compounds of the present invention, including the bases per se as well as their quaternary derivatives and acid salts of the same, are useful as peripheral spasmolytics with psychotropic effects. In particular, the quaternary derivatives are strong parasympatholytics. The usual dosage unit forms of therapeutic administration may be employed. For example, the active substance may be composited with a suitable pharmaceutical carrier to provide solutions, syrups, tablets, capsules, suppositories, powders, or the like.

The following non-limiting examples will further illustrate the products and processes of the invention:

*Example 1*

6 gm. N-β-dimethylaminoethyl-o-acetamido-diphenylamine were stirred with 60 gm. polyphosphoric acid (82.5–83% $P_2O_5$) for 1½ hours at 150–160° C. After diluting with water, the dark homogeneous solution was treated with sufficient concentrated ammonia to give a definitely alkaline reaction after the hydrolysis of the superfluous polyphosphoric acid. The resulting thick yellowish brown oil was dissolved in ether. The resulting base was purified by exhaustive extraction from the ether with dilute acetic acid and liberated again with ammonia. A further extraction with ether, followed by washing of the ethereal solution with water and drying with sodium sulfate, resulted after filtration and concentration in a yield of 5.4 gm. spontaneously crystallizable residue. Double recrystallization from methanol-water solution yielded 4.3 gm. (76% theor. yield) 5-β-dimethylaminoethyl - 11 - methyl - 5 - dibenzo [b,e] [1,4] - diazepin, as lemon yellow platelets, M.P. 113°–115° C.

The starting compound N-β-dimethylaminoethyl-o-acetamido-diphenylamine was obtained by alkylating o-nitro-diphenylamine with sodium amide in dioxane and a solution of β-chloroethyl-dimethylamine in benzol. A 77% yield of N-β-dimethylaminoethyl-o-nitro-diphenylamine is obtained as a mobile red oil of B.P. 152–155° C. at 0.05 torr. This substance was then converted practically quantitatively by catalytic hydrogenation with Raney nickel in alcohol into N-β-dimethylaminoethyl-o-amino-diphenylamine. This product is a light reddish oil, B.P. 151° C. at 0.01 torr. On standing for a long time this oil solidifies into a crystalline mass at room temperature. Acetylation with acetanhydride in pyridine according to well known methods gives almost quantitatively N-β-dimethylaminoethyl - o - acetamido-diphenylamine, M.P. 72° C. (out of ether-petroleum ether).

*Example 2*

4.3 gm. N-β-dimethylaminoethyl-o-formamido-diphenylamine were reacted with polyphosphoric acid and treated exactly as in Example 1. 3.6 gm. (89% theor. yield) 5-β-dimethylaminoethyl - 5 - dibenzo [b,e][1,4]-diazepin were obtained as yellow crystals, M.P. 97–98° C. (out of petroleum ether).

To prepare the N-β-dimethylaminoethyl-o-formamido-diphenylamine, 5 gm. N-β-dimethylaminoethyl-o-amino-diphenylamine were refluxed for 15 hours with a mixture of 2.9 gm. acetanhydride and 25 ml. 100% formic acid, this mixture being previously refluxed for 2 hours. After vacuum concentration and usual procedure, 4.3 gm. (77% theor. yield) of the formyl compound is obtained, M.P. 85–86° C. (out of ether-petroleum ether).

*Example 3*

5.1 gm. N-γ-dimethylaminopropyl-o-acetamido-diphenylamine were reacted with polyphosphoric acid and treated as in Example 1. The 83% yield (4.0 gm.) of 5-γ-dimethylaminopropyl - 11 - methyl-5-dibenzo-[b,e]-[1,4]-diazepin was a thick yellow oil, B.P. 153° C. at 0.05 torr.

To prepare the starting material, o-nitro-diphenylamine was alkylated with γ-dimethylamino-propylchloride as in Example 1. The 60% yield of N-γ-dimethyl-aminopropyl-o-nitro-diphenylamine was obtained as a red oil, B.P. 162–163° C. at 0.05 torr. By catalytic hydrogenation with Raney nickel in alcohol, N-γ-dimethyl-aminopropyl-o-aminodiphenylamine was obtained as a reddish oil which on standing solidifies into a crystalline mass, B.P. 162° C. at 0.05 torr. By heating with acetanhydride to 60° C. and after standing for a long time at room temperature, an 82% yield of N-γ-dimethyl-aminopropyl-o-acetamido-diphenylamine was obtained as a very viscous resin distillable at 179–180° C. at 0.05 torr.

*Example 4*

15.4 gm. of N-γ-dimethylaminopropyl-o-formamido-diphenylamine were reacted with polyphosphoric acid to complete the ring following the same treatment as in Example 1. 9.5 gm. (65% theor. yield) of 5-γ-dimethylaminopropyl-5-dibenzo - [b,e][1,4] - diazepin were obtained as a thick yellow oil, B.P. 167° C. at 0.05 torr.

N-γ-dimethylaminopropyl - o - formamido - diphenylamine, M.P. 60–61° C. (out of petroleum ether), was obtained in 88% yield from N-γ-dimethylaminopropyl-o-amino-diphenylamine (see Example 3) by treating with a formylizing mixture of formic acid and acetanhydride as indicated in Example 2.

*Example 5*

7.44 gm. of N-γ-dimethylamino-propyl-2-acetamido-5-chlorodiphenylamine gave by closing the ring by reaction with polyphosphoric acid as in Example 1, 4.3 gm. (61% theor. yield) 7-chloro-11-methyl-5-γ-dimethylamino-propyl-5-dibenzo-[b,e][1,4]-diazepin as a yellow oil, B.P. 165° C. at 0.03 torr. Maleinate, M.P. 184–186° C. (out of methanol-ether).

In the preparation of the starting substance, 2-nitro-5-chloro-diphenylamine was alkylated according to Example 1 with γ-dimethylaminopropyl-chloride, and the N-γ-dimethylaminopropyl - 2 - nitro - 5 - chlorodiphenylamine (red oil, B.P. 185° C. at 0.05 torr., 66% theor. yield) obtained was reduced with Raney nickel in alcohol to N-γ-dimethylaminopropyl - 2 - acetamido - 5 - chlorodiphenylamine (thickish oil, B.P. 170–175° C. at 0.05 torr., 95% theor. yield). Acetylation with acetanhydride according to Example 3 gave quantitatively N-γ-dimethylaminopropyl-2-acetamido-5-chlorodiphenylamine as a distillable resin (182° C. at 0.03 torr.).

*Example 6*

6.23 gm. N-β-dimethylaminoethyl-2-formamido-5-chlorodiphenylamine gave after treatment with polyphosphoric acid (1½ hours at 140–145° C., otherwise same conditions as Example 1) 3.77 gm. (64% theor. yield) 7-chloro-5-β-dimethylaminoethyl - 5 - dibenzo-[b,e][1,4]-diazepin, M.P. 83–85° C. (out of ether-petroleum ether).

N-β-dimethylaminoethyl - 2 - formamido - 5 - chlorodiphenylamine (M.P. 123–125° C. out of acetone-petroleum ether) was obtained in 81% yield through formylizing the corresponding 2-amino compound as in Example 2. The latter, M.P. 101–103° C. out of ether-petroleum ether, was obtained in 95% yield by the hydrogenation with Raney nickel in alcohol of N-β-dimethylaminoethyl-2-nitro-5-chlorodiphenylamine (red oil, B.P. 165° C. at 0.05 torr.) which had been produced with an 82% yield in a manner similar to Example 5 from 2-nitro-5-chlorodiphenylamine.

*Example 7*

From 12 gm. N - β - dimethylaminoethyl-o-isobutyramido-diphenylamine and 120 gm. of polyphosphoric acid, 6.55 gm. 5-β-dimethylaminoethyl-11-isopropyl-5-dibenzo-[b,e][1,4]-diazepin were obtained, as per Example 1, B.P. 150–155° C. at 0.01 torr., yellow crystals, M.P. 72–74° C. from petroleum ether.

N-β-dimethylaminoethyl - o - isobutyramido - diphenylamine (oil, B.P. 170° C. at 0.1 torr.) was obtained from N - β - dimethylaminoethyl-o-amino-diphenylamine (see Example 1) with isobutyrylchloride in pyridine.

*Example 8*

From 12.15 gm. N-γ-dimethylaminopropyl-o-isobutyramido-diphenylamine and 120 gm. polyphosphoric acid, 5.5 gm. 5-γ-dimethylaminopropyl-11-isopropyl-5-dibenzo-[b,e][1,4]-diazepin were obtained, in the same manner as in Example 1, as a thick yellow oil, B.P. 163–165° C. at 0.03 torr.

N-γ-dimethylaminopropyl - o - isobutyramido - diphenylamine (oil, B.P. 173° C. at 0.05 torr.) was obtained exactly as in Example 7 from N-dimethylamino-propyl-o-aminodiphenylamine (see Example 3).

*Example 9*

From 20 gm. N-β-diethylaminoethyl-o-acetamido-diphenylamine and 180 gm. polyphosphoric acid are obtained, as per Example 1, 15 gm. 5-β-diethylaminoethyl-11-methyl-5-dibenzo-[b,e][1,4]-diazepin which crystallized from petroleum ether as yellow crystals, M.P. 77–79° C.

N-β-diethylaminoethyl-o-acetamido-diphenylamine was obtained by the same method as in Example 1. Nitro compound, B.P. 170–172° C. at 0.07 torr.; amino compound, B.P. 178–181° C. at 0.1 torr.; acetamido compound, B.P. 178–182° C. at 0.04 torr.

*Example 10*

From 21 gm. N-γ-diethylaminopropyl-o-acetamido-diphenylamine and 190 gm. polyphosphoric acid, 18 gm. 5-γ-diethylaminopropyl-11-methyl-5-dibenzo - [b,e,][1,4]-diazepin (B.P. 180–183° C. at 0.03 torr.) are obtained, as per Example 1.

N-β-diethylaminopropyl-o-acetamidodiphenylamine was obtained as per Example 1. Nitro compound, B.P. 173–176° C. at 0.06 torr.; amino compound, B.P. 180–183° C. at 0.1 torr.; acetamido compound, 195–200° C. at 0.08 torr.

*Example 11*

From 27 gm. N-β-piperidinoethyl-o-acetamido-diphenylamine and 250 gm. polyphosphoric acid, 23 gm. 5-β-piperidinoethyl - 11 - methyl-5-dibenzo-[b,e][1,4]-diazepin were obtained as per Example 1, crystallizing from acetone-ether (1:4) as yellow prismatic crystals, M.P. 144–145° C.

N-β-piperidinoethyl-o-acetamido-diphenylamine was prepared as per Example 1. Nitro compound, B.P. 195–199° C. at 0.07 torr.; amino compound, M.P. 87–88° C.; acetamido compound, B.P. 176–179° C. at 0.02 torr.

*Example 12*

From 22 gm. N-γ-piperidinopropyl-o-acetamidodiphenylamine and 200 gm. polyphosphoric acid, 17 gm. 5-γ-piperidinopropyl-11-methyl-5-dibenzo-[b,e][1,4]-diazepin, M.P. 185–189° C. at 0.008 torr., were obtained as per Example 1.

N-γ-piperidinopropyl-o-acetamido-diphenylamine was prepared as per Example 1. Nitro compound, B.P. 197–201° C. at 0.07 torr.; amino compound, B.P. 176–180° C. at 0.04 torr.; acetamido compound, M.P. 98–99° C.

*Example 13*

As per Example 1, from 11 gm. N-γ-piperidinopropyl-o-propionamido-diphenylamine and 100 gm. polyphosphoric acid, 8.8 gm. 5-γ-piperidinopropyl-11-ethyl-5-dibenzo-[b,e][1,4]-diazepin were obtained, whose maleate crystallized from methanol-ether (1:5) in yellow prismatic crystals, M.P. 140–142° C.

N-γ-piperidinopropyl-o-propionamido-diphenylamine was obtained as in Examples 1 and 12; pripionamido compound, M.P. 60–61° C.

*Example 14*

As per Example 1, from 11 gm. N-γ-pyrrolidinopropyl-o-acetamido-diphenylamine and 100 gm. polyphosphoric acid, 8 gm. 5-γ-pyrrolidinopropyl-11-methyl-5-dibenzo-[b,e][1,4]-diazepin were obtained, whose maleate crystallized out of acetone as yellow prismatic needles, M.P. 126–127° C.

N-γ-pyrrolidinopropyl-o-acetamido-diphenylamine was obtained as in Example 1. Nitro compound, B.P. 190–195° C. at 0.02 torr.; amino compound, B.P. 170–175° C. at 0.02 torr.; acetamido compound, M.P. 191–192° C.

*Example 15*

As per Example 1, from 12 gm. N-γ-pyrrolidinopropyl-o-propionamido-diphenylamine and 100 gm. polyphosphoric acid, 11 gm. 5-γ-pyrrolidinopropyl-11-ethyl-5-dibenzo-[b,e][1,4]-diazepin were obtained whose tartrate crystallized out of isopropanol-acetone (1:3) as yellowish prisms, M.P. 139–140° C.

N-γ-pyrrolidinopropyl-o-propionamido-diphenylamine was obtained as per Examples 1 and 13. Propionamido compound, B.P. 180–184° C. at 0.01 torr.

*Example 16*

As per Example 1, from 14 gm. N-β-N'-methylpiperazinoethyl-o-acetamido-diphenylamine and 180 gm. polyphosphoric acid, 9.9 gm. 5-β-N'-methylpiperazino-ethyl-11-methyl-5-dibenzo-[b,e][1,4]-diazepin were obtained which crystallized in yellow prisms, M.P. 136° C., from acetone-ether (1:9).

N-β-N'-methylpiperazinoethyl-o-acetamido-diphenylamine was obtained as per Example 1. Nitro compound, B.P. 200–203° C. at 0.02 torr.; amino compound, M.P. 183–185° C.; acetamido compound, B.P. 199–203° C at 0.01 torr.

*Example 17*

As per Example 1, from 15 gm. N-γ-N'-methylpiperazinopropyl-o-acetamido-diphenylamine and 190 gm. polyphosphoric acid, 10.1 gm. 5-γ-N'-methylpiperazinopropyl-11-methyl-5-dibenzo[b,e][1,4]-diazepin were obtained, whose maleate crystallized as yellow crystals, M.P. 166–168° C., from methanol-acetone (1:9).

N-γ-N'-methylpiperazinopropyl-o-acetamido-diphenylamine was obtained as per Example 1. Nitro compound, B.P. 200–204° C. at 0.02 torr.; amino compound, B.P. 200–203° C. at 0.01 torr.; acetamido compound, M.P. 164–166° C.

*Example 18*

As per Example 1, from 15 gm. N-γ-morpholinopropyl-o-acetamido-diphenylamine and 140 gm. polyphosphoric acid, 12 gm. 5-γ-morpholinopropyl-11-methyl-5-dibenzo-[b,e][1,4]-diazepin were obtained which crystallized in yellow prisms, M.P. 90–92° C., from ether-petroleum ether (1:4).

N-γ-morpholinopropyl-o-acetamido-diphenylamine was obtained as per Example 1. Acetamido compound hydrochloride, M.P. 175–178° C.; amino compound, B.P. 185–189° C. at 0.07 torr.

*Example 19*

As per Example 1, from 20 gm. N-piperidino-isopropyl-o-acetamido-diphenylamine and 190 gm. polyphosphoric acid, 17 gm. 5-piperidino-isopropyl-11-methyl-5-dibenzo-[b,e][1,4]-diazepin were obtained which formed yellow crystals, M.P. 118–121° C., from ether-petroleum ether (1:4).

N-piperidino-isopropyl-o-acetamido-diphenylamine was obtained as per Example 1. Nitro compound hydrochloride, M.P. 202–206° C.; acetamido compound hydrochloride, M.P. 100–103° C.

*Example 20*

As per Example 1, from 8 gm. N-β-dimethylaminoethyl-2-acetamido-4'-methoxy-diphenylamine and 70 gm. polyphosphoric acid, 4 gm. 5-β-dimethyl-aminoethyl-2-methoxy-11-methyl-5-dibenzo-[b,e][1,4]-diazepin were obtained which crystallized as yellow prisms, M.P. 103–105° C., from ether-petroleum ether (1:3).

N-β-dimethylaminoethyl-2-acetamido-4'-methoxy-diphenylamine was obtained as per Example 1. Nitro compound, B.P. 165–169° C. at 0.07 torr.; acetamido compound hydrochloride, M.P. 192–195° C.

*Example 21*

As per Example 1, from 37 gm. N-γ-dimethylaminopropyl-2-acetamido-4'-methoxy-diphenylamine and 350 gm. polyphosphoric acid, 15.5 gm. 5-γ-dimethylaminopropyl-2-methoxy-11-methyl-5-dibenzo-[b,e][1,4]-diazepin were obtained whose maleate crystallized as yellow needles, M.P. 138–139° C., from acetone-ether (1:3).

N-γ-dimethylaminopropyl-2-acetamido-4'-methoxy-diphenylamine was obtained as per Example 1. Nitro compound, B.P. 167–171° C. at 0.01 torr.; amino compound, B.P. 165–169° C. at 0.07 torr.; acetamido compound, B.P. 182–185° C. at 0.08 torr.

*Example 22*

As per Example 1, from 31 gm. N-β-dimethylaminoethyl-2-acetamido-3'-methoxy-diphenylamine and 300 gm. polyphosphoric acid, 23.5 gm. 5-β-dimethylaminoethyl-3-methoxy-11-methyl-5-dibenzo[b,e][1,4]-diazepin were obtained which formed yellow crystals, M.P. 100–101° C., from ether-petroleum ether (1:3).

N-β-dimethylaminoethyl-2-acetamido-3'-methoxy-diphenylamine was obtained as per Example 1. Nitro compound, B.P. 180–184° C. at 0.07 torr.; amino compound, B.P. 174–178° C. at 0.06 torr.; acetamido compound, M.P. 79–80° C.

*Example 23*

As per Example 1, from 27 gm. N-γ-dimethylaminopropyl-2-acetamido-3'-methoxy-diphenylamine and 260 gm. polyphosphoric acid, 17.8 gm. 5-γ-dimethylaminopropyl-3-methoxy-11-methyl-5-dibenzo[b,e][1,4]-diazepin were obtained whose maleate crystallized in yellow prismatic crystals, M.P. 161–164° C., from methanol-ether (1:9).

N-γ-dimethylaminopropyl-2-acetamido-3'-methoxy-diphenylamine was obtained as per Example 1. Nitro compound, B.P. 185–189° C. at 0.07 torr.; amino compound, B.P. 177–180° C. at 0.06 torr.; acetamido compound, B.P. 192–195° C. at 0.07 torr.

Example 24

As per Example 1, from 25 gm. N-β-dimethylaminoethyl-2-acetamido-2'-methoxy-diphenylamine and 240 gm. polyphosphoric acid, 16 gm. 5-γ-dimethylaminoethyl-4-methoxy-11-methyl-5-dibenzo-[b,e][1,4]-diazepin were obtained which crystallized as yellow prims, M.P. 94–97° C., from petroleum ether.

N - β - dimethylaminoethyl - 2 - acetamido-2'-methoxy-diphenylamine was obtained as per Example 1. Nitro compound, B.P. 160–165° C. at 0.07 torr.; amino compound, B.P. 150–154° C. at 0.07 torr.; acetamido compound, M.P. 94–95° C.

Example 25

As per Example 1, from 21 gm. N-γ-dimethylaminopropyl-2-acetamido-2'-methoxy-diphenylamine and 200 gm. polyphosphoric acid, 15.5 gm. 5-γ-dimethylaminopropyl - 4 - methoxy - 11 - methyl-5-dibenzo-[b,e][1,4]-diazepin were obtained which crystallized as yellow prismatic crystals, M.P. 90–91° C., from ether-petroleum ether (1:4).

N - γ - dimethylaminopropyl-2-acetamido-2'-methoxy-disphenylamine was obtained as per Example 1. Nitro compound, B.P. 165–168° C. at 0.07 torr.; acetamido compound, B.P. 185–188° C. at 0.07 torr.

Example 26

As per Example 1, from 9.2 gm. N-β-dimethylaminoethyl-2-acetamido-5-methoxy-diphenylamine and 90 gm. polyphosphoric acid, 4.1 gm. 5-β-dimethylaminoethyl-7-methoxy-11-methyl-5-dibenzo-[b,e][1,4]-diazepin were obtained which crystallized in ochre-yellow prisms, M.P. 101–103° C., from ether-petroleum ether (1:3).

The preparation of N-β-dimethylaminoethyl-2-acetamido-5-methoxy-diphenylamine was carried out exactly as in Example 1. 2-nitro-5-methoxy-diphenylamine, orange colored crystals M.P. 113–113.5° C. from ether-petroleum ether (1:4), was obtained by the condensation of 3-chloro-4-nitro-anisol and aniline in the presence of sodium acetate; whence the basic substituted nitro compound (red oil, B.P. 188° C. at 0.05 torr.) was obtained. Amino compound (oil, B.P. 170° C. at 0.03 torr.); acetamido compound (resin, B.P. 200° C. at 0.05 torr.).

Example 27

As per Example 1, from 9.68 gm. N-γ-dimethylaminopropyl-2-acetamido-5-methoxy-diphenylamine and 95 gm. polyphosphoric acid, 2.55 gm. 5-γ-dimethylaminopropyl-7-methoxy-11-methyl-5-dibenzo-[b,e][1,4]-diazepin were obtained whose maleate, M.P. 152–155° C., was crystallized with difficulty by dilution in a little acetic ester containing acetone, followed by successive addition of ether and final washing with acetic-acid-ether (1:1).

N - γ - dimethylaminopropyl-2-acetamido-5-methoxy-diphenylamine was prepared as per Examples 1 and 26. Nitro compound, orange red crystals, M.P. 85–87° C. from ether-petroleum ether (1:3); amino compound, B.P. 167–168° C. at 0.01 torr.; acetamido compound, B.P. 200° C. at 0.05 torr.

Example 28

As per Example 1, from 11.25 gm. N-β-dimethylaminoethyl-2-acetamido-4-methoxy-diphenylamine and 110 gm. polyphosphoric acid, 5.2 gm. 5-β-dimethylaminoethyl-8-methoxy-11-methyl-5-dibenzo-[b,e][1,4]-diazepin were obtained as a thick yellow oil, B.P. 162–163° C. at 0.01 torr.

N - β - dimethylaminoethyl - 2-acetamido-4-methoxy-diphenylamine was obtained exactly as in Example 1 from 2-nitro-4-methoxy-diphenylamine. Nitro compound, crude product, red oil; amino compound, B.P. 176–178° C. at 0.05 torr.; acetamido compound hydrochloride, M.P. 235–236° C. from methanol-ether (1:3).

Example 29

As per Example 1, from 11.9 gm. N-γ-dimethylaminopropyl-2-acetamido-4-methoxy-diphenylamine and 115 gm. polyphosphoric acid, 5,3 gm. 5-γ-dimethylaminopropyl - 8 - methoxy-11-methyl-5-dibenzo-[b,e][1,4]-diazepin were obtained as a thick yellow oil, B.P. 173–174° C. at 0.01 torr.

N - γ - dimethylaminopropyl-2-acetamido-4-methoxy-diphenylamine was obtained as per Examples 1 and 28. Nitro compound, only crude form isolated; amino compound, B.P. 184–185° C. at 0.05 torr.; acetamido compound hydrochloride, M.P. 132–134° C. from acetone-ether (1:4).

Example 30

As per Example 1, from 8.75 gm. N-β-dimethylaminoethyl-2-acetamido-5-chloro-diphenylamine and 85 gm. polyphosphoric acid, 4.9 gm. 5-β-dimethylaminoethyl-7-chloro-11-methyl-5-dibenzo-[b,e][1,4]-diazepin were obtained as pale yellow crystals, M.P. 86–88° C. (from petroleum ether).

N - β - dimethylaminoethyl - 2 - acetamido - 5 - chloro-diphenylamine (B.P. 177–180° C. at 0.05 torr.) was obtained as per Example 1 from the corresponding amino compound (see Example 6).

Example 31

As per Example 1, from 6.18 gm. N-γ-dimethylaminopropyl-2-formamido-5-chloro-diphenylamine and 60 gm. polyphosphoric acid, 4.95 gm. 5-γ-dimethylaminopropyl-7 - chloro - 5 - dibenzo - [b,e][1,4] - diazepin were obtained whose maleate formed crystals, M.P. 155–156° C. from isopropanol-ether (1:2).

N - γ - dimethylaminopropyl - 2 - formamido - 5-chloro-diphenylamine, M.P. 99–101° C. from ether-petroleum ether (1:4), was prepared as per Example 2 from the corresponding amino compound (see Example 5).

Example 32

As per Example 1, from 6.55 gm. N-β-dimethylaminoethyl-2-formamido-4-chloro-diphenylamine and 65 gm. polyphosphoric acid, 3.85 gm. 5-β-dimethylaminoethyl-8-chloro-5-dibenzo [b,e][1,4]-diazepin were obtained as a thick yellow oil, B.P. 171–173° C. at 0.02 torr.

N - β - dimethylaminoethyl - 2 - formamido - 4 - chloro-diphenylamine was prepared as in Examples 1 and 2 from 2-nitro-4-chloro-diphenylamine. Basic substituted nitro compound, red oil, B.P. 169° C. at 0.01 torr.; amino compound, B.P. 145° C. at 0.02 torr.; formamido compound, distillable resin, B.P. 175–180° C. at 0.07 torr.

Example 33

As per Example 1, from 19.65 gm. N-γ-dimethylaminopropyl-2-acetamido-4-chloro-diphenylamine and 190 gm. polyphosphoric acid, 13.1 gm. 5-γ-dimethylaminopropyl-8 - chloro - 11 - methyl - 5 - dibenzo - [b,e][1,4] - diazepin were obtained as a thick yellowish oil, B.P. 174–175° C. at 0.06 torr.

N - γ - dimethylaminopropyl - 2 _ acetamido - 4-chloro-diphenylamine was prepared as per Examples 1 and 32. Nitro compound, B.P. 165° C. at 0.04 torr.; amino compound, B.P. 165° C. at 0.08 torr.; acetamido compound, B.P. 185° C. at 0.03 torr.

Example 34

2.65 gm. 5-β-dimethylaminoethyl-5-dibenzo-[b,e][1,4]-diazepin, obtained as in Example 2, were diluted in 15 ml. benzol and reacted with 1.56 gm. methyliodide. After standing overnight the separated crystals were suction filtered and recrystallized from methanol-ether (1:3) to give 3.9 gm. (85% theor. yield) 5-β-dimethylaminoethyl - 5 - dibenzo - [b,e][1,4] - diazepin - methoiodide, M.P. 234–235° C. (with decomposition)

The methoiodide can be converted into the methobromide by shaking with silver bromide. The methobromide crystallized from methanol-ether (1:4) in fine yellow crystals, M.P. 235–237° C. (with decomposition).

Example 35

3 gm. 5 - β - piperidinoethyl - 11 - methyl - 5 - dibenzo-[b,e][1,4]-diazepin, obtained in the manner of Example 11, were dissolved in 70 ml. warm acetone, treated with 1.18 gm. dimethylsulfate, and refluxed for 15 minutes. By concentrating the solution, the methosulfate crystallized as yellow platelets, M.P. 152–153° C.; yield 3.5 gm.

Example 36

3 gm. 5 - γ - morpholinopropyl - 11 - methyl - 5 - dibenzo-[b,e][1,4]-diazepin, obtained as in Example 18, were dissolved in 30 ml. acetone, treated with 1.12 gm. dimethylsulfate, and refluxed for 15 minutes. By careful concentration of the solution the methosulfate crystallized as yellow crystals, M.P. 161–162° C.; yield 3.4 gm.

Example 37

4 gm. 5 - γ - piperidinopropyl - 11 - methyl - 5 - dibenzo-[b,e][1,4]-diazepin, obtained as in Example 12, were reacted as in Example 40 with 1.7 gm. methyliodide. 4.8 gm. methoiodide were obtained as crystals from isopropanol-ether (3:1), M.P. 206–208° C. (with decomposition).

The methoiodide can, as in Example 39, be converted into the methobromide by shaking with silver bromide. The methobromide crystallized from acetone in yellow crystals, M.P. 204–206° C.

Example 38

3.3 gm. 5 - γ - piperidinopropyl - 11 - methyl - 5 - dibenzo-[b,e][1,4]-diazepin, obtained as in Example 12, were dissolved in 20 ml. isopropanol, treated with 2.2 gm. methylbromide, and heated for 3 hours in a sealed tube (bomb) at 100° C. After cooling, the dimethobromide was crystallized by the addition of acetone in yellow crystals, M.P. 234–237° C. (with decomposition); yield 3.5 gm.

Example 39

4 gm. 5 - β - piperidinoethyl - 11 - methyl - 5 - dibenzo-[b,e][1,4]-diazepin, obtained as per Example 11, were reacted as in Example 43 with 2.9 gm. methylbromide. The dimethobromide was obtained from isopropanol-ether (2:1) as golden yellow crystals, M.P. 259–261° C. (with decomposition); yield 4.2 gm.

Example 40

3.3 gm. 5 - γ - dimethylaminopropyl - 11 - phenyl - 5 - dibenzo-[b,e][1,4]-diazepin, obtained according to Example 35, were dissolved in 30 ml. acetone, treated with 1.17 gm. dimethylsulfate, and refluxed for 15 minutes. After cooling the crystals were suction filtered and 3.4 gm. methosulfate were obtained as yellow prismatic crystals, M.P. 219–224° C. (with decomposition).

Example 41

As per Example 1, from 9.54 gm. N-β-N'-methylpiperazino-ethyl-2-acetamido-5-chloro-diphenylamine and 95 gm. polyphosphoric acid 6.3 gm. 5-β-N-methyl-piperazino - ethyl - 7 - chloro - 11 - methyl - 5 - dibenzo-[b,e][1,4]-diazepin were obtained as pale yellow crystals, M.P. 101–103° C. (from ether-petroleum ether).

N - β - N' - methyl - piperazino - ethyl - 2 - acetamido-5-chloro-diphenyl-amine (B.P. 203–204° C. at 0.01 torr.) was obtained as per Example 5 without isolation of the intermediate products.

Example 42

As per Example 1, from 11.9 gm. N-β-morpholinoethyl-2-acetamido-5-chloro-diphenylamine and 120 gm. polyphosphoric acid 7.7 gm. 5-β-morpholinoethyl-7-chloro-11-methyl-5-dibenzo [b,e][1,4]-diazepin were obtained as pale yellow, small needles, M.P. 64–67° C. (from cold ether-petroleum ether).

N - β - morpholinoethyl - 2 - acetamido - 5 - chloro-diphenylamine (B.P. 213° C. at 0.01 torr.) was obtained as per Example 46.

Example 43

As per Example 1, from 8.0 gm. N-γ-morpholinopropyl-2-acetamido-5-chloro-diphenylamine and 80 gm. polyphosphoric acid 5.5 gm. 5-γ-morpholinopropyl-7-chloro-11-methyl-5-dibenzo [b,e][1,4]-diazepin were obtained as pale yellow crystals, M.P. 128–130° C. (from ether-petroleum ether).

N - γ - morpholinopropyl - 2 - acetamido - 5 - chloro-diphenylamine (B.P. 210–212° C. at 0.007 torr.) was prepared as per Example 46.

Example 44

As per Example 40, from 3.86 gm. 5-β-dimethylaminoethyl - 11 - methyl - 5 - dibenzo - [b,e][1,4] - diazepin (prepared as per Example 35) 4.0 gm. of the methosulfate were obtained, which was soluble in acetone and not crystallizable.

Example 45

From 18.5 gm. of N-β-dimethylamino-ethyl-2-acetamido - 4 - methyl - diphenylamine and 185 gm. of polyphosphoric acid, there are obtained, as in Example 1, 16.1 gm. of 5-β-dimethylamino-ethyl - 8,11 - dimethyl - 5 - dibenzo-[b,e][1,4]-diazepine as a yellow oil having a B.P of 153–154° C./0.05 mm. Hg, whose maleate crystallizes from (1:3) acetone-ether in the form of prisms having a M.P. of 152–154° C.

The N-β-dimethylamino-ethyl - 2 - acetamido-4-methyl-diphenylamine compound (M.P. 90–92° C., from petroleum ether) used as starting material and its first stages are obtained as in Example 1. The 2-nitro-4-methyl-diphenylamine compound is a red oil having a B.P. of 145–147° C./0.01 mm. Hg. The indicated basic-substituted nitro compound is a red oil having a B.P. of 160°–163° C./0.005 mm. Hg, and the indicated basic-substituted amino compound is an oil having a B.P. of 140–141° C./0.01 mm. Hg.

Example 46

From 5.1 gm. of N-β-dimethylamino-ethyl-2-acetamido-2-methylmercapto-diphenylamine and 51 gm. of polyphosphoric acid, there are obtained, as in Example 1, 3.4 gm. of 4-methylmercapto-5-β-dimethylamino-ethyl-11-methyl-5-dibenzo-[b,e][1,4]-diazepine having a B.P. of 170–172° C./0.5 mm. Hg, which is crystallizable from petroleum ether in the form of prisms which have a M.P. of 79–81° C.

The N-β-dimethylamino-ethyl - 2 - acetamido-2-methyl-mercapto-diphenylamine (M.P. 130°–132° C., from acetone-petroleum ether) used as starting material and its first stages are prepared as in Example 1. The 2-nitro-2-methylmercapto - diphenylamine compound consists of bright red crystals having a M.P. of 96–97° C. The specified basic-substituted nitro compound need not be isolated in the pure state, but can be directly converted into the basic-substituted amino compound having a B.P. of 163–165° C./0.05 mm. Hg by reduction with sodium dithionate.

This application is a continuation-in-part of our co-pending U.S. application Serial No. 3,275, filed January 19, 1960, now abandoned.

We claim:
1. A compound selected from the group consisting of: (A) the 5-dibenzo-[b,e][1,4]-diazepin derivatives, substituted in position 5, having the formula

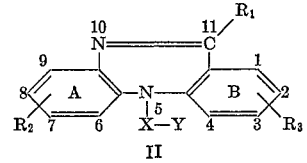

II wherein $R_1$ is a member of the class consisting of hydrogen, methyl, ethyl, propyl and isopropyl; $R_2$ and $R_3$ are members of the class consisting of hydrogen, chlorine, methyl, ethyl, methoxy, ethoxy, methylthio and ethylthio; X is a hydrocarbon chain containing between 2 and 3 inclusive carbon atoms; and Y is a member of the class consisting of dimethylamino, diethylamino, methyl-ethyl-amino, pyrrolidino, piperidino, morpholino, N'-methyl-piperazino, and N'-ethyl-piperazino; (B) the non-toxic therapeutically useful mono- and di-quaternary ammonium salts of (A) having an alkyl group as the organic substituent and having as the anionic substituent a group selected from the class consisting of sulfate, halide and sulfonate; and (C) the non-toxic therapeutically useful acid addition salts of (A) and (B).

2. 5-β-dimethylaminoethyl - 11 - methyl - 5 - dibenzo-[b,e][1,4]-diazepin.

3. 5-γ-diethylaminopropyl - 11 - methyl - 5 - dibenzo-[b,e][1,4]-diazepin.

4. 5 - γ - pyrrolidinopropyl - 11 - methyl - 5 - dibenzo-[b,e][1,4]-diazepin.

5. 5 - β - N' - methylpiperazino - ethyl - 11 - methyl - 5-dibenzo-[b,e][1,4]-diazepin.

6. 5 - piperidino - isopropyl - 11 - methyl - 5 - dibenzo-[b,e][1,4]-diazepin.

7. 5-β-dimethylaminoethyl - 7 - methoxy - 11-methyl-5-dibenzo-[b,e][1,4]-diazepin.

8. 5-β-dimethylaminoethyl - 7 - chloro - 11 - methyl-5-dibenzo-[b,e][1,4]-diazepin.

9. 5-β-N-methyl-piperazino-ethyl - 7 - chloro-11-methyl-5-dibenzo-[b,e][1,4]-diazepin.

References Cited in the file of this patent

FOREIGN PATENTS 738,013     Great Britain _____ Oct. 5, 1955

OTHER REFERENCES

Uhlig: Angewandte Chemie, vol. 66, pp. 435–6 (1954).

UNITED STATES PATENT OFFICE
CERTIFICATE OF CORRECTION

Patent No. 3,129,216  April 14, 1964

Jean Schmutz et al.

It is hereby certified that error appears in the above numbered patent requiring correction and that the said Letters Patent should read as corrected below.

In the grant, line 1, and in the heading to the printed specification, line 4, for "Fritz Humziker", each occurrence, read -- Fritz Hunziker --; column 1, line 56, after "methoxy," insert -- ethoxy, --; line 61, for "morhpolino" read -- morpholino --; column 7, line 6, for "prims" read -- prisms --; line 23, for "disphenylamine" read -- diphenylamine --.

Signed and sealed this 8th day of September 1964.

(SEAL)
Attest:

ERNEST W. SWIDER
Attesting Officer

EDWARD J. BRENNER
Commissioner of Patents